March 13, 1962 R. S. MARTIN 3,025,440
ELECTRICAL DEVICE AND DIELECTRIC MATERIAL THEREFOR
Filed Aug. 28, 1958
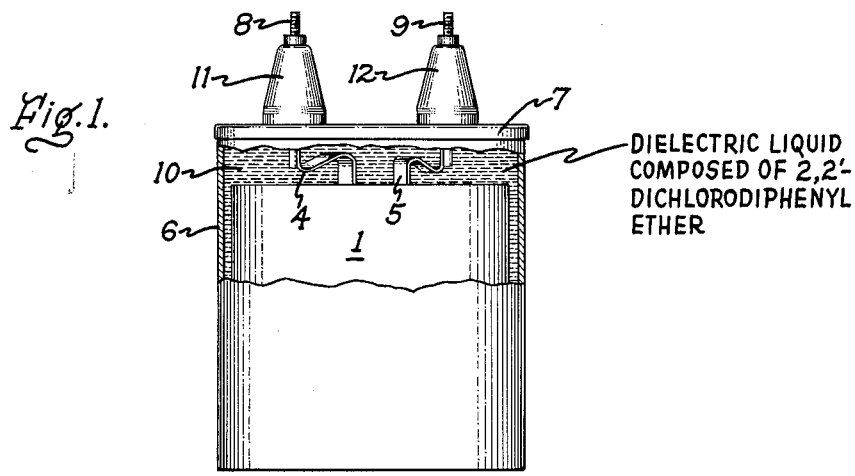
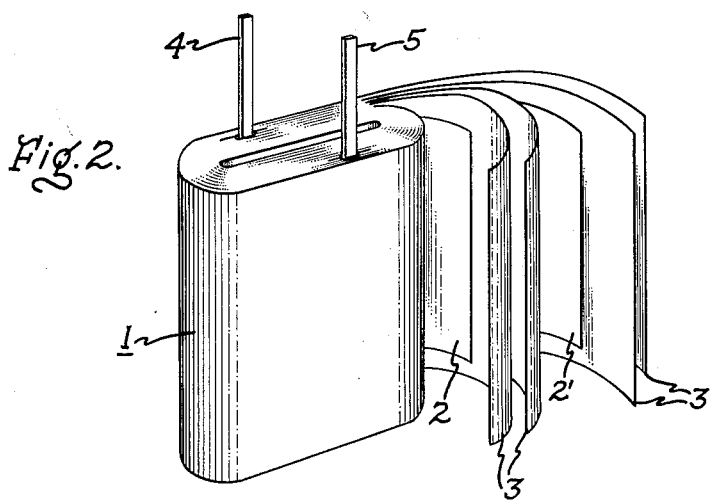
Inventor,
Raymond S. Martin,
by Gilbert P. Tarleton
His Attorney.

United States Patent Office 3,025,440
Patented Mar. 13, 1962

3,025,440
ELECTRICAL DEVICE AND DIELECTRIC
MATERIAL THEREFOR
Raymond S. Martin, Hudson Falls, N.Y., assignor to General Electric Company, a corporation of New York
Filed Aug. 28, 1958, Ser. No. 757,712
4 Claims. (Cl. 317—258)

The present invention relates to electrical devices and dielectric material therefor, and more particularly relates to electrical capacitors having a dielectric liquid which confers improved electrical characteristics and prolonged life thereon under severe operating conditions.

Liquid dielectric materials have been used in many cases heretofore in electrical capacitors in preference to solid or resinous types of dielectrics for various reasons. In general, liquids more easily and thoroughly impregnate the capacitor assemblies and are not subject to failures such as caused by voids in the solid dielectric materials. Also, solid organic dielectrics are usually characterized by relatively low dielectric constants and consequently lower capacitance values are obtained in capacitors having such dielectrics.

However, dielectric liquids used heretofore for capacitors, such as mineral oil, the halogenated aromatic compounds known as askarels, and other known dielectric liquids, have not been found to have fully satisfactory characteristics at the low temperatures to which capacitors may be subjected. Certain of these liquids, such as mineral oils, have low dielectric constant in general, and others such as the askarels suffer a marked capacitance drop at low temperatures.

It is an object of the present invention to provide electrical devices having an improved dielectric material which avoids the disadvantages of the known dielectric compositions.

It is a further object of the invention to provide electrical capacitors incorporating a dielectric liquid which confers thereon improved electrical characteristics and prolonged life under a wide range of operating conditions, and particularly at low temperatures.

It is still another object of the invention to provide a dielectric liquid for electrical devices, particularly electrical capacitors, which confers markedly improved capacitance properties on the capacitor, even at low temperatures, maintains this capacitance with only slight variations over a wide temperature range, is suitable for use at high operating temperatures, and lends itself to the low pressure, high temperature impregnating processes usually employed in the manufacture of capacitors.

With the above objects in view, the present invention relates to an electrical device, particularly in electrical capacitor, comprising the combination of spaced conductors having interposed therebetween a dielectric liquid composed of 2,2'-dichlorodiphenyl ether, the dielectric liquid preferably being used in combination with a porous dielectric spacer material arranged between the conductors.

The invention will be better understood from the following description taken in conjunction with the accompanying drawing, in which:

FIG. 1 is an elevational view of a sealed roll type capacitor, shown partly broken away, to which the present invention is applicable; and FIG. 2 is a perspective view of the wound capacitor section of the FIG. 1 device showing the section partly unrolled.

Referring now to the drawing, there is shown a capacitor device comprising a rolled capacitor section 1 made up in conventional arrangement of wound alternate layers of metal foil 2, 2' and dielectric sheets 3. The metallic foils 2, 2' serve as the capacitor electrodes or armatures and may be composed of aluminum, copper, tantalum, lead, tin, or any other known or suitable type of capacitor electrode material. Instead of separate foil and insulation sheets, sheets of metallized paper or equivalent material could be used to form the capacitor roll. Electrical contact with the armatures 2, 2' is made by tap straps 4, 5 of electrically conducting material which are applied to the armatures and project from the end of the capacitor section. The interleaved dielectric spacers 3 may be composed of one or more sheets ranging in thickness from 0.2 to 5 mils and preferably consist of a cellulosic material such as kraft paper, or similar porous or impregnatable sheets. Other types of dielectric spacer material such as sheets of reconstructed mica, synthetic resins, ceramics, or other known or suitable types of dielectric material may be used, or composite dielectric spacers of any suitable combination of such materials may be employed.

The wound capacitor section 1 is enclosed in casing 6 provided with a cover 7 and containing a dielectric liquid 10, more fully described hereinafter, substantially filling the casing and impregnating the wound capacitor section. On cover 7, which seals the interior of casing 6, there are arranged bushing insulators 11, 12 on which are mounted terminals 8, 9 respectively connected to tap straps 4, 5.

Capacitors of known construction other than that shown could be used, for example, those having exposed armature foils in which tap straps may be dispensed with.

In the manufacture of the capacitor described, the assembly of wound electrode foils and dielectric spacer may, if desired, be first impregnated with the liquid dielectric medium 10 under conditions which cause the dielectric liquid to thoroughly impregnate the dielectric sheets, the impregnated assembly is then placed in the capacitor casing, and additional dielectric liquid introduced, after which the casing is fluid-tightly sealed by cover 7. Alternatively, the unimpregnated capacitor roll section 1 may be initially placed in the capacitor casing 6 and then impregnated, in accordance with known practice, after introducing the liquid dielectric medium in the casing in a manner to substantially fill the casing and any voids in the capacitor roll section. Thereafter, the casing is sealed.

The dielectric material 10 in accordance with the invention is a liquid composed essentially of 2,2'-dichlorodiphenyl ether. This material has been found to impart unexpectedly improved properties to capacitors especially under very low temperature conditions. This material, which is also known as bis(o-chlorophenyl) ether, has the following structure:

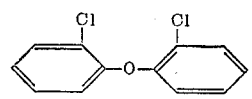

Typical properties of this liquid were found to be as follows:

*Table I*

| | °C. | |
|---|---|---|
| 60 cycle DK, 30 volts/mil | 102 | 9.4 |
| 60 cycle PF, 30 volts/mil | 102 | 7% |
| Volume resistivity 500 volts D.C. | 100 | 500×10⁹ ohm-cm. |
| 1,000 cycle DK | 100 | 9.3 |
| 1,000 cycle PF | 100 | 0.7% |
| Pour Point | | −38°C. |

As will be evident from this data, this material exhibits a remarkably high dielectric constant, and this characteristic coupled with good resistivity and low pour point makes it eminently suitable for capacitor application.

Tests were conducted to evaluate capacitor units impregnated with the 2,2'-dichlorodiphenyl ether dielectric liquid of the invention, the capacitors used being identically constructed of wound sections formed of two sheets of aluminum foil 0.25 mil thick separated by three sheets of kraft paper 0.4 mil thick. Measurement of the electrical properties of such capacitors over a wide range of temperatures yielded the following data:

*Table II*

| Temp., °C. | Capacitance, μf | Percent of Room Temp. Cap. |
|---|---|---|
| 100 | 1.3420 | 94.77 |
| 75 | 1.3730 | 96.86 |
| 50 | 1.4002 | 98.87 |
| 21 | 1.4160 | 100.00 |
| 0 | 1.4305 | 101.02 |
| −25 | 1.4345 | 101.31 |
| −40 | 1.4202 | 100.30 |
| −45 | 1.3747 | 97.08 |

As is apparent from the above data, capacitors incorporating the present dielectric liquid are capable of maintaining 94% or better of their room temperature capacitance over the range of temperature of −45° C. to 100° C., and, further, will maintain approximately 100% of room temperature capacitance even when held at −40° C. for at least 136 hours.

Capacitor units incorporating the 2,2'-dichlorodiphenyl ether dielectric liquid show an increase in capacity of approximately 30–40% over similar units impregnated with conventional askarel dielectric liquids and of approximately 100% over similar units having a mineral oil dielectric liquid. In comparative life tests conducted on capacitor units of the above described construction wherein the capacitors were subjected to 1000 volts D.C. at 125° C., the units containing 2,2'-dichlorodiphenyl ether proved far superior in life characteristics to the askarel impregnated capacitors. This result was quite unexpected in view of the somewhat lower insulation resistance which characterized the 2,2'-dichlorodiphenyl ether units. Thus, under the above life test conditions, the four askarel-type units tested all failed in less than 250 hours, with an average life of 28 hours; while the four units having an askarel dielectric liquid stabilized with 2-tertiary butyl anthraquinone had an average life of 474 hours. In contrast, the four units impregnated with 2,2'-dichlorodiphenyl ether proved to have an average life under the same conditions of more than 808 hours, with three of the four units not having yet failed when the data was taken at the 994-hour stage.

To obtain the optimum benefits of the present invention, it is essential that the dielectric liquid be free of contaminants and impurities which will impair the dielectric properties of 2,2'-dichlorodiphenyl ether.

The following procedure was used in the preparation of the 2,2'-dichlorodiphenyl ether used in practicing the invention:

The 2,2'-dichlorodiphenyl ether was prepared by diazotizing 2-chloro-2'-aminophenyl ether and then converting the diazonium salt to the dichlorodiphenyl ether by the Sandmeyer reaction.

Approximately 1500 ml. of 3 M hydrochloric acid was heated almost to boiling in a 4-liter beaker. One mole of 2-chloro-2'-aminophenyl ether was added to the hot, dilute acid while stirring constantly. The beaker was then removed from the hot plate and placed in a bath of commercial trichlorethylene (duPont Triclene). While the hot acid was stirred with an electric stirrer, the temperature of the bath was lowered with Dry Ice. The amine hydrochloride soon began to crystallize, and the temperature was lowered to 0° C. A solution of 5 M sodium nitrite was added slowly with rapid stirring until a positive test was achieved with starch-iodide test paper at least ten minutes after the last addition of nitrite. During and subsequent to the addition of nitrite, the temperature of the reaction mixture was maintained below 5° C.

Before starting diazotization, two 5-liter, 3-neck flasks were set up with precision bore stirrers, reflux condensers, and dropping funnels. One-half mole of cuprous chloride, plus ten percent excess, and one liter of 9 M hydrochloric acid were added to each flask. With constant stirring, the flasks were heated to a steady reflux by means of electric heating mantles.

When diazotization was complete, the solution was divided into two equal portions. One-half of the solution of diazonium salt was trickled slowly into each refluxing solution of cuprous chloride in 9 M hydrochloric acid. After the addition was complete, the reaction mixtures were stirred and refluxed for 5–10 minutes. With the heating mantles turned off, cold water was added through the condenser until the flasks were full. The mixture was stirred vigorously during addition of cold water to wash the organic phase. The aqueous phase was then very carefully decanted. The final separation was made with a separatory funnel. The 2,2'-dichlorodiphenyl ether was distilled under vacuum. After a small forecut, which consisted mainly of 2-chlorophenyl ether, the main body of liquid distilled between 166.5–167.5° C. at 10 mm. Hg pressure.

There is thus provided by the invention electrical capacitors which have remarkably constant capacity properties over a wide temperature range and which have superior life characteristics even under severe operating conditions.

Although the present dielectric liquid has been found eminently suitable for capacitor application as described above, it may find suitable application for other purposes. The stable liquid character and electrical properties of the present dielectric material over a considerable range of temperature may provide substantial benefits in various types of electrical devices such as transformers, switchgear and the like which are often subjected to a wide variation of operating conditions.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. An electrical device comprising in combination spaced conductors normally charged with unlike electrical potential, and a dielectric liquid interposed between said conductors, said dielectric liquid consisting essentially of 2,2'-dichlorodiphenyl ether.

2. An electrical capacitor comprising in combination cooperating armatures, and a dielectric liquid interposed between said armatures consisting essentially of 2,2'-dichlorodiphenyl ether.

3. An electrical capacitor comprising in combination cooperating armatures, dielectric spacer material interposed between said armatures, and a dielectric liquid impregnating said dielectric spacer material and filling the voids in the capacitor, said dielectric liquid consisting essentially of 2,2'-dichlorodiphenyl ether.

4. An electrical capacitor comprising in combination cooperating armatures, dielectric spacer material comprising kraft paper interposed between said armatures, and a dielectric liquid composed essentially of 2,2'-dichlorodiphenyl ether impregnating said kraft paper spacer.

References Cited in the file of this patent

UNITED STATES PATENTS

| | | |
|---|---|---|
| 2,022,634 | Britton et al. | Nov. 26, 1935 |
| 2,041,594 | Clark | May 19, 1936 |
| 2,165,813 | Prutton | July 11, 1939 |
| 2,170,782 | Clark | Aug. 22, 1939 |
| 2,890,396 | Hutzler et al. | June 9, 1959 |
| 2,892,972 | Ross | June 30, 1759 |

FOREIGN PATENTS

| | | |
|---|---|---|
| 199,985 | Switzerland | Dec. 1, 1938 |